Oct. 7, 1930. J. T. PEARSON ET AL 1,777,530
COVER FOR CONDUIT OUTLET BOXES
Filed April 15, 1925
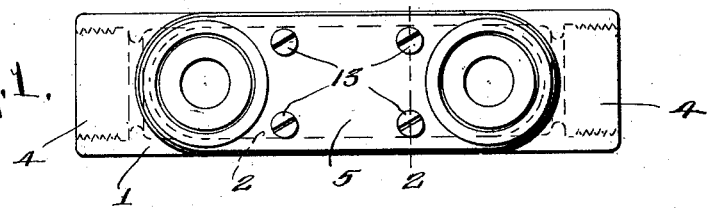
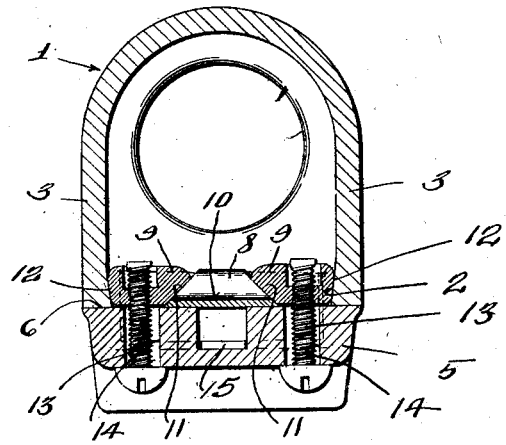
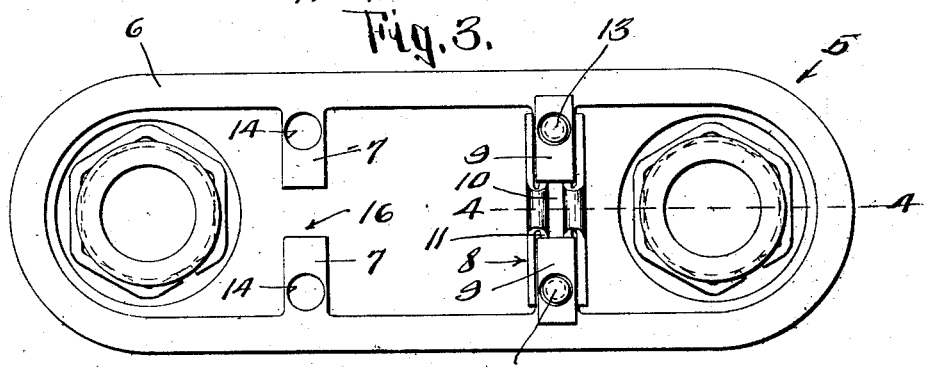
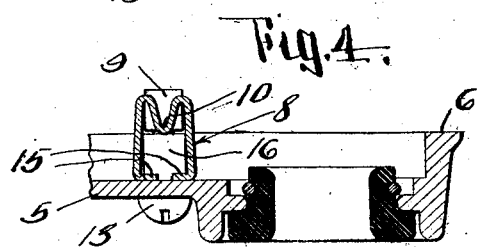
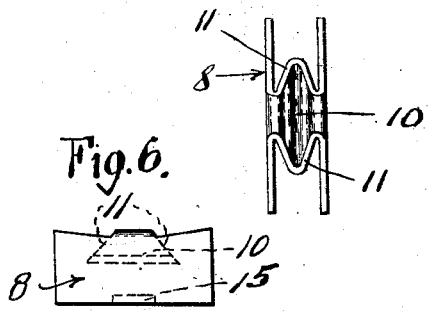
INVENTORS.
John T. Pearson, Raymond H. Olley.
BY
Parsons & Bodell.
ATTORNEYS.

Patented Oct. 7, 1930

1,777,530

UNITED STATES PATENT OFFICE

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK

COVER FOR CONDUIT OUTLET BOXES

Application filed April 15, 1925. Serial No. 23,334.

This invention relates to covers for conduit outlet boxes of the type set forth in our Patent No. 1,525,689, issued February 10, 1925, and has for its object a particularly simple and efficient construction and arrangement of the fastening means and the cover by which the fastening means in its entirety can be readily applied to the finished cover.

The invention consists in the novel features and in the combinations and constructions hereinafter set forth and claimed.

In describing this invention, reference is had to the accompanying drawing in which like characters designate corresponding parts in all the views.

Figure 1 is a face view of one form of conduit outlet box provided with this cover.

Figure 2 is an enlarged sectional view on line 2—2, Figure 1.

Figure 3 is an inner face view of the cover showing one set of fastening means applied thereto and another removed therefrom.

Figure 4 is a fragmentary sectional view on line 4—4, Figure 3.

Figure 5 is a detail view of the carrier or abutment of the attaching means.

Figure 6 is a side elevation of the abutment member.

This invention comprises a cover for a conduit outlet box and means for attaching the cover to the box by thrusting faces or shoulders thereon against the inner walls confining the opening of the box and comprising a carrier or abutment arranged on the inner face of the cover and separable therefrom and preferably attachable thereto with no fastening members but by merely slipping or laying it in place on the cover, and fastening or clamping means as one or more wedges coacting with the carrier or abutment to hold it to the cover and to be thrust laterally thereby during the clamping movement of such member or members and an operating means as a screw or screws operable from the outside of the cover and extending through the cover and threading into the clamping member or members so that upon tightening of the screw or screws the wedge or wedges are thrust laterally into engagement with the inner wall of the box and also firmly clamp the carrier or abutment to the cover.

In the illustrated embodiment of our invention, two sets of attaching means are associated with the cover and also two wedges or nuts with each set. Although, in use if desired, one nut can remain in its clamped position and the other nut operated to attach and detach the cover or the base may be constructed to thrust directly against one side of the box while the wedge thrusts against the other side.

1 designates the conduit outlet box which is comparatively shallow and has an opening 2 in one side, this opening being usually oblong or elongated and comparatively narrow and confined on its long side by flat walls 3 which are free of obstruction as lugs for receiving clamping screws. The box is also provided with means as one or more nipples 4 for coupling it to the conduit enclosing the service wires. These nipples or their passages are located out of line with the fastening means on the cover, so that the wires entering the box or passing through the box or passing out of the box through the cover are unobstructed by the fastening means.

5 designates the cover for the open side 2 of the box. The cover having a raised marginal bearing face 6 for overlying the edge of the wall confining the opening 2, this bearing face 6 being as high as or higher than the inner surface or any part thereof of the intermediate or body part of the cover.

This cover is also provided with one or more transversely extending projections or ribs 7, the outer edges of which are not higher than the marginal bearing face 6. Preferably, the edges faces of these transverse ribs 7 are substantially flush with the marginal bearing face 6.

Owing to the fact that no surface of the cover projects outwardly beyond the plane of, or is higher than, the marginal surface 6, the marginal surface can be machined or ground flat in order to lie close to the edge of the wall around the opening 2 of the box.

8 is the carrier or abutment of the means for attaching the cover to the box, this carrier or abutment being separable from the cover and as here shown it coacts with the transverse rib 7 and is in the general form of a channel, the side walls or flanges of which embrace the rib 7, that is, the channel is arranged astride the rib 7.

9 designates the wedge members, these wedge members being arranged between the end portions of the side flanges of the channel or carrier or abutment 8, and each nut or wedge 9 and the carrier or abutment 8 are formed with coacting surfaces which when the nut is tightened tends to wedge the nut laterally into engagement with the opposing side wall of the box and also to clamp the carrier or abutment member onto the inner face of the cover or onto the rib 7. As here illustrated, the bottom of the channel or carrier or abutment terminates short of the ends of the carrier or abutment in order to permit the nut or nuts to be placed between the side flanges of the base 8 and this bottom is in the form of a corrugation 10, the end edges of which are beveled outwardly as at 11 and each nut 9 is formed with a corresponding beveled face coacting with the edge 11.

The face of each nut 9 which coacts with the wall 3 of the box is also slightly beveled as at 12 and coact with a correspondingly beveled face on the wall of the box.

13 are screws extending through openings 14 in the cover and threading into the nuts. In order to prevent shifting of the carrier or abutment 8 means is provided by which it interlocks with the rib 7 against endwise movement, and as here illustrated, the side flanges are provided with inturned lugs 15 at their lower edges and midway between their ends, these lugs extending into a notch 16 between the ends of each rib 7. The notch usually extends the full depth of the rib.

In operation, after the cover or the bearing face 6 thereof is machined or ground, the carriers or abutments 8 are placed on the ribs 7, the screws inserted in the holes 14 and threaded into the nuts, and usually the ends of the shanks of the nuts are headed at 17 to prevent complete detachment of the screws from the nut. After the cover is applied to the box, the screws are tightened causing the nuts to be thrust laterally against the inner faces of the walls of the box and also causing the nuts to clamp the base 8 securely in place. Owing to the beveled faces 12 of the nuts and the correspondingly beveled faces on the walls of the box, the cover is drawn tightly onto the box and owing to the greater incline of the cam faces 11 on the carrier or abutment 8 with respect to the incline of the faces 12 on the nuts, the nuts are thrust laterally and the cover tightly clamped in position upon a small movement of the screws 13. If desired, the nut at one end of each carrier or abutment 8 may be clamped onto the carrier or abutment to its full extent before the cover is placed on the box and the other nut 9 operated to attach the cover to the box or one nut may be omitted and the carrier or abutment shaped to thrust at one end directly against the opposing wall of the box.

Owing to this construction of attaching means by which the entire attaching means is attachable to the cover, the cover can be readily finished to fit the box before the attaching means are assembled onto the cover.

What we claim is:

1. The combination with a conduit outlet box having an opening in one side, a cover for the open side having a marginal bearing face overlying the edge of the wall around the opening, the cover also having a transverse projection on its inner side, the transverse projection being formed with a notch between its ends, and means carried by the cover for attaching the cover to the box, comprising an abutment in the form of a channel arranged astride the projection, and having inwardly extending lugs located in the notch and shouldering against the walls thereof, the bottom of the channel terminating short of the ends thereof, and being provided with outwardly inclined faces, nuts arranged in the end portions of the channel and coacting with the inclined faces to be thrust laterally during clamping movement of the nuts toward the cover, and screws extending through the cover from the outer side thereof and threading into the nut.

2. The combination with a conduit outlet box having an opening in one side, of a cover for the open side, the cover being provided with a raised marginal bearing face for overlying the edge of the wall of the box around the opening raised projections within the marginal bearing face, said bearing face and the outer end faces of said projections being arranged in substantially the same plane, means carried by the cover for attaching the cover to the box comprising an abutment carried on the inner face of the cover within said marginal bearing face, the cover and said abutment having interlocking means for detachably securing the abutment to the cover, means for engaging the inner walls of the box to secure the cover to the box including a laterally movable wedge member coacting with the abutment, the abutment and the wedge member having coacting faces arranged to act inclined plane fashion for moving said wedge member laterally into engagement with the wall of the box and means extending through the cover and coacting with the wedge member for operating the same.

3. The combination with a conduit outlet box having an opening in one side, of a cover for the open side having a marginal bearing face overlying the edge of the wall around the opening, the cover also having a transverse projection on its inner side, an abutment in the form of a channel arranged astride said projection snugly fitting the same, clamping means coacting with opposing walls of the box and including wedging means coacting with the abutment, the wedging means and the abutment having faces arranged to coact inclined plane fashion and means operable from the outer side of the cover for effecting the movement of the wedging means.

4. The combination with a conduit outlet box having an opening in one side, of a cover for the open side having a marginal bearing face overlying the edge of the wall around the opening, the cover also having a transverse projection on its inner side, an abutment in the form of a channel arranged astride the projection, the end portions of the bottom of the channel being removed and the intermediate portion of the bottom being formed with an inwardly projecting corrugation extending into the channel, the end edges of said corrugation being beveled, nuts arranged in each end portion of the channel between the flanges and coacting with said beveled faces and screws extending through the cover from the outer side thereof and threading into the nuts.

5. The combination with a conduit outlet box having an opening in one side, of a cover for the open side having a marginal bearing face overlying the edge of the wall around the opening, the cover also having a transverse projection on its inner side, an abutment in the form of a channel arranged astride the projection, the end portions of the bottom of the channel being removed and the intermediate portion of the bottom being formed with an inwardly projecting corrugation extending into the channel, nuts arranged in each end portion of the channel between the flanges and coacting with the end edges of the corrugations, the nut and end edges having faces formed to coact inclined plane fashion and screws extending through the cover from the outer side thereof and threading into the nuts, each projection being formed with notches in opposite sides thereof and the flanges of the channel of the abutment having inturned lugs between the ends of said flanges for interlocking with the notches.

In testimony whereof, we have hereunto signed our names, at Syracuse, in the county of Onondaga, and State of New York, this 6th day of April, 1925.

JOHN T. PEARSON.
RAYMOND H. OLLEY.